United States Patent
Mirskiy

(10) Patent No.: US 6,909,617 B1
(45) Date of Patent: Jun. 21, 2005

(54) ZERO-VOLTAGE-SWITCHED, FULL-BRIDGE, PHASE-SHIFTED DC-DC CONVERTER WITH IMPROVED LIGHT/NO-LOAD OPERATION

(75) Inventor: Gregory Mirskiy, Buffalo Grove, IL (US)

(73) Assignee: La Marche Manufacturing Co., Des Plaines, IL (US)

( * ) Notice: Subject to any disclaimer, the term of this patent is extended or adjusted under 35 U.S.C. 154(b) by 0 days.

(21) Appl. No.: 10/762,431

(22) Filed: Jan. 22, 2004

(51) Int. Cl.$^7$ .............................................. H02M 3/335
(52) U.S. Cl. ........................ 363/17; 363/98; 363/132
(58) Field of Search ........................ 363/16, 17, 95, 363/98, 131, 132

(56) References Cited

U.S. PATENT DOCUMENTS

| | | | | |
|---|---|---|---|---|
| 4,692,851 A | * | 9/1987 | Attwood | 363/16 |
| 5,546,294 A | * | 8/1996 | Schutten et al. | 363/17 |
| 5,619,401 A | * | 4/1997 | Karlsson et al. | 363/17 |
| 5,875,103 A | * | 2/1999 | Bhagwat et al. | 363/17 |
| 6,178,099 B1 | * | 1/2001 | Schutten et al. | 363/17 |
| 6,246,599 B1 | * | 6/2001 | Jang et al. | 363/132 |
| 6,292,375 B1 | * | 9/2001 | Perol | 363/21.01 |
| 6,483,723 B2 | * | 11/2002 | Kuranuki et al. | 363/17 |
| 2002/0001203 A1 | * | 1/2002 | Jitaru | 363/17 |

OTHER PUBLICATIONS

"A New Full Bridge Zero Voltage Switched Phase Shifted DC–DC Converter with Enlarged Duty Cycle and ZVS Range", by J. Beirante and B. Borges, published in *3$^{rd}$ Conference on Telecommunications CONFTELE 2001*, Apr. 23–24, 2001, Figueira da Foz, Portugal.

"A New Family of Full–Bridge ZVS Converters" by Y. Jang and M. Jovanovic, published in *IEEE Applied Power Electronics Conf. (APEC) Proc.*, Miami Beach, FL., Feb. 9–13, 2003, pp. 622–628.

* cited by examiner

*Primary Examiner*—Adolf Berhane
(74) *Attorney, Agent, or Firm*—Emrich & Dithmar LLC

(57) ABSTRACT

A zero-voltage-switched, full-bridge, phase-shifted DC-DC converter for use in a DC power supply or battery charger includes a power transformer, four switching transistors connected to form a full bridge, and a decoupling capacitor and resonant inductor connected in series to the primary winding of the power transformer. At high loads, i.e., high output voltages, the resonant inductor charges the stray and internal capacitance of the switching transistors. Under light loads or in a no-load condition, with the current through the resonant inductor insufficient to allow the inductor to recharge these capacitances, the combination of a second inductor connected at one end to the central tap of the power transformer's primary winding and at its second opposed end to the middle point of a capacitive voltage divider, permits the second inductor to store enough energy to effectively recharge the stray and internal capacitance of the switching transistors for improved operating efficiency.

10 Claims, 4 Drawing Sheets

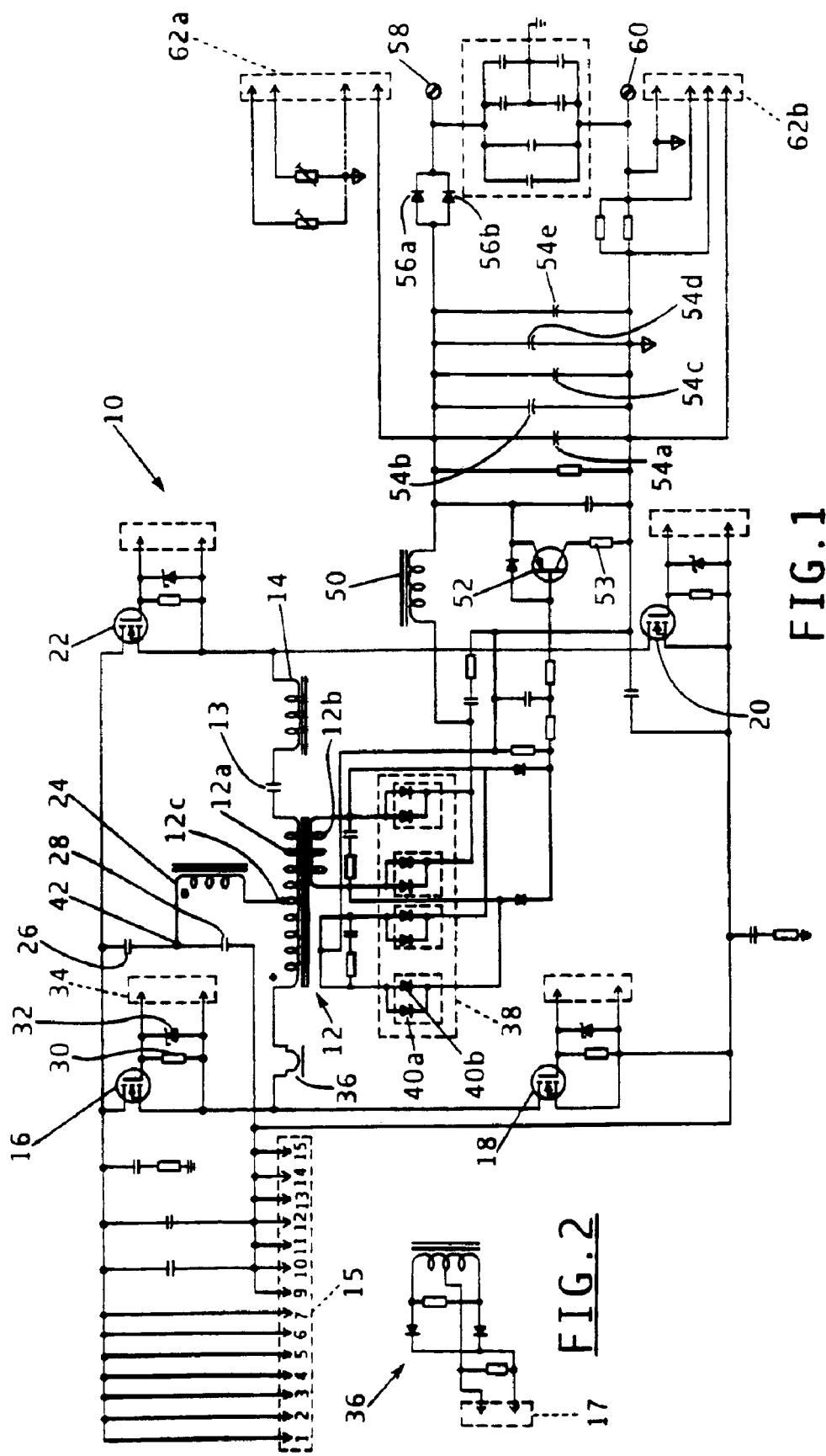

ZERO-VOLTAGE-SWITCHED, FULL-BRIDGE, PHASE-SHIFTED DC-DC CONVERTER WITH IMPROVED LIGHT/NO-LOAD OPERATION

FIELD OF THE INVENTION

This invention relates generally to DC power supplies or battery chargers and is particularly directed to an arrangement for increasing the operating efficiency of a zero-voltage-switched, full-bridge, phase-shifted DC-DC converter such as used in a DC power supply or a battery charger.

BACKGROUND OF THE INVENTION

Zero-voltage-switched (ZVS), full-bridge (FB), phase-shifted (PS) converters are commonly used for DC-DC conversion because of the several advantages that they offer over other approaches. These advantages include high efficiency, i.e., reduced duty cycle loss, due to zero-voltage-switching, or "soft" switching, a relatively small circulating energy, and constant frequency operation allowing for simple control of the converter. DC-DC converters of this type are typically incorporated in a wide range of DC power supplies having various applications such as in battery chargers.

One disadvantage of the conventional ZVS-FB-PS converter is the dependence of the ZVS condition on the output load. At high output loads, a resonant inductor is typically used for storing energy and charging the stray and internal capacitance of the converter's switches. For light or zero loads, the ZVS condition is lost as is the high efficiency of this type of converter. To increase the efficiency for light or zero loads, a large commutating inductor is provided in series with the converter's power transformer to permit ZVS operation over a wide range of loads. However, the incorporation of this large inductor gives rise to very high conduction loses when the load is high and also results in a decrease in the effective duty-cycle because of slower changes in the primary current polarity. This increased inductance also gives rise to severe voltage ringing across the secondary-side output rectifiers due to resonance between the inductance and the junction capacitance of the rectifier.

Various other approaches have been proposed for increasing the efficiency of the ZVS-FB-PS DC-DC converter under the full range of output load conditions. For example, "A New Full Bridge Zero Voltage Switched Phase Shifted DC-DC Converter with Enlarged Duty Cycle and ZVS Range", by J. Beirante and B. Borges, published in $3^{rd.}$ Conference on Telecommunications CONFTELE 2001, Apr. 23–24, 2001, Figueira da Foz, Portugal, discloses a converter having an LCC auxiliary circuit connected to one end of the primary winding of the power transformer between the middle point of a voltage capacitor divider and the middle point of the passive-active leg of the bridge circuit. This arrangement allegedly reinforces the primary current during the passive-to-active transition thus increasing the available energy to achieve ZVS. Another approach is described in "A New Family of Full-Bridge ZVS Converters" by Y. Jang and M. Jovanovic, published in IEEE Applied Power Electronics Conf, (APEC) Proc., Miami Beach, Fla., Feb. 9–13, 2003, pp. 622–628. In this approach, two magnetic components, i.e., a transformer and a coupled inductor or a single-winding inductor, are used to respectively provide isolated output(s) and to store energy for ZVS. The volts-second products change in opposite directions with a change in phase shift between the two bridge legs. Both of these approaches substantially increase the complexity of the FB-ZVS converter and require careful consideration of various other circuit parameters for successful implementation.

The present invention addresses the aforementioned limitations of the prior art by providing a ZVS-FB-PS converter particularly adapted for use in a soft switching mode DC power supply which allows for efficient operation of the converter over a full range of output loads by maintaining the stray and internal capacitance of the converter's switches fully charged under all operating conditions. At light or no-loads, the center tap of the primary winding of the converter's power transformer undergoes the full voltage swing of the input alternating current for storing sufficient energy in the combination of an inductor and a pair of capacitors connected to the converter's switches provide ZVS operation under these load conditions.

OBJECTS AND SUMMARY OF THE INVENTION

Accordingly, it is an object of the present invention to provide a full-bridge, zero-voltage-switched DC-DC converter which affords high operating efficiency at high and low output voltage loads, including at zero loading.

It is another object of the present invention to provide an arrangement for a DC switched mode power supply which maintains the stray and internal capacitances of the switching elements fully charged at high and low load conditions for improved power supply operating efficiency.

Yet another object of the present invention is to provide in a DC-DC converter incorporating plural switching devices arranged in a full bridge configuration essentially zero voltage across the switching devices during switching for reducing switching losses and electromagnetic interference and increasing operating efficiency.

The present invention contemplates an arrangement for converting a first DC input voltage to a second DC output voltage by means of a full-bridge, zero-voltage-switched phase-shift DC-DC converter employing plural switching devices, wherein the stray and internal capacitance of the switching devices is maintained fully charged under all operating conditions for improved DC converter operating efficiency. A first resonant inductor is coupled to the primary winding of the DC-DC converter's power transformer and stores energy for maintaining the switching devices fully charged under high output loading. The combination of a second inductor and a pair of serially connected capacitors is coupled to the DC-DC converter's power transformer as well as to the switching devices. The second inductor is connected between the central tap of the power transformer's primary winding and a middle point of the two capacitors which form a voltage divider for maintaining the switching devices fully charged under low or zero output loading.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a schematic diagram of a zero-voltage-switched, full-bridge, phase-shifter DC-DC converter in accordance with the principles of the present invention;

FIG. 2 is a schematic diagram of a current transformer for use in the zero-voltage-switched, full bridge, phase-shifted DC-DC converter of FIG. 1;

DETAILED DESCRIPTION OF THE PREFERRED EMBODIMENTS

Figure 3:
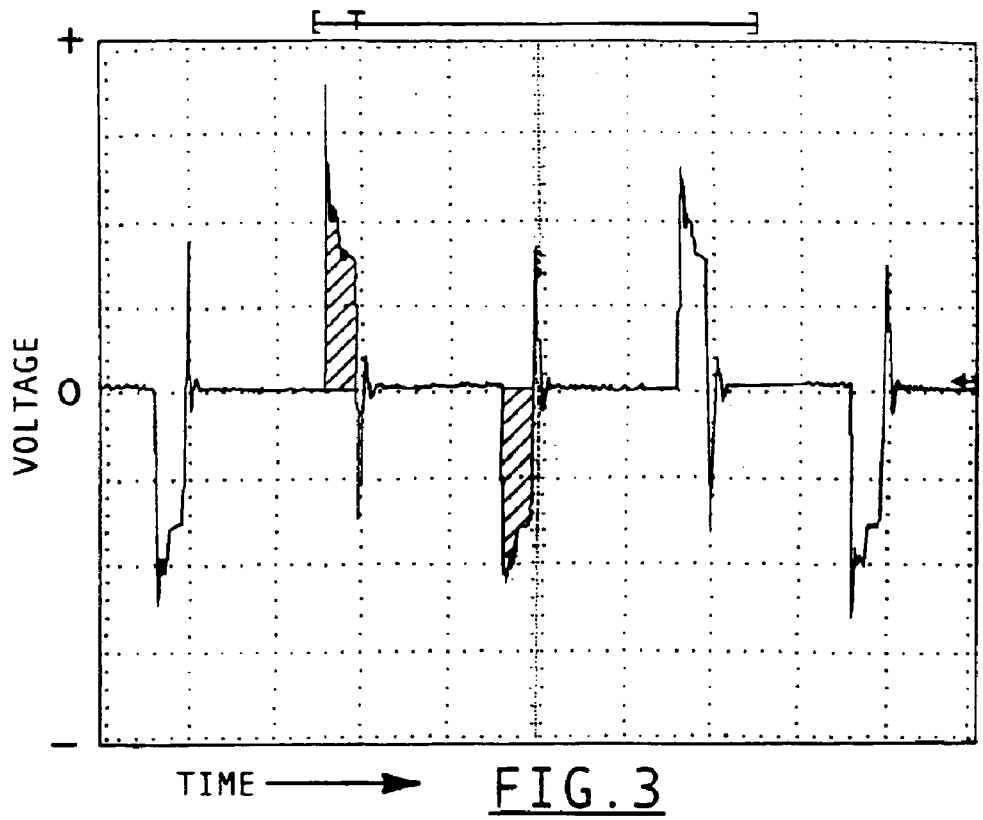
FIG. 3 shows a signal waveform illustrating the energy provided to and stored in a resonant inductor in a DC-DC converter under high load operating conditions.

Referring to FIG. 1, there is shown a schematic diagram of a zero-voltage-switched, full-bridge, phase-shifted DC-DC converter 10 with light load or no-load operating conditions compensation in accordance with the principles of the present invention. The inventive DC-DC converter 10 is intended for use in a DC power supply where a DC input voltage is converted to a regulated DC output voltage. These types of DC power supplies are used in various applications such as in battery chargers, telecommunications systems, motor drives, etc.

DC-DC converter 10 includes a power, or voltage, transformer 12 having a primary winding 12a and a secondary winding 12b. An input current is provided to the power transformer's primary winding 12a through the primary of a current transformer 36, which is shown in greater detail in the schematic diagram of FIG. 2. Connector 17 of the current transformer 36 secondary shown in FIG. 2 is used for connecting the current transformer to a feedback control circuit which does not form a part of the present invention and thus is not shown in the figure for simplicity.

DC-DC converter 10 further includes four switching elements, which in FIG. 1 are shown as switching transistors 16, 18, 20 and 22. The four switching transistors 16, 18, 20 and 22 operate in a conventional manner in the DC-DC converter 10. Thus, in order to provide the required DC output voltage level, diagonally disposed switching transistors shown in FIG. 1 are alternately rendered conductive and non-conductive in a shared manner. For example, when a high output voltage is required, switching transistors 16 and 20 are simultaneously rendered conductive, while switching transistors 18 and 22 are rendered non-conductive. Then, switching transistors 16 and 20 rendered non-conductive and switching transistors 18 and 22 rendered conductive. In this manner, a high output voltage is provided by DC-DC converter 10 at its first and second output terminals 58, 60. For a low voltage output, or an output of 0 volts, adjacent switching transistors are rendered conductive in an alternating manner. Thus, for a low or zero voltage output, switching transistors 16 and 22 are rendered conductive, while switching transistors 18 and 20 are rendered non-conductive. This is followed by switching transistors 18 and 20 being rendered conductive and switching transistors 16 and 22 being rendered non-conductive. Alternating positive and negative pulses are rectified to provide a DC voltage at the output terminals 58, 60 of the DC-DC converter 10. With reference to the first switching transistor 16, an electrical connector 34 is coupled to each switching transistor by means of the combination of a resistor 30 and diode 32. Resistor 30 and diode 32 provide proper biasing for the switching transistor to insure that it turns on and turns off in accordance with an input provided to the switching transistor by means of connector 34. Similar connector and resistor/diode combinations are coupled to the remaining three switching transistors 18, 20 and 22 for connecting the switching transistors to a feedback control circuit which does not form a part of the present invention and thus is not shown in the figure for simplicity. Outputs from the DC-DC converter 10 are provided to this control circuit by means of connectors 62a and 62b in a feedback arrangement as is conventional in these types of DC-DC converters.

Also connected to primary winding 12a of power transformer 12 is the serial combination of a decoupling capacitor 13 and a resonant inductor 14. Decoupling capacitor 13 prevents saturation of the core by blocking the DC component of a current passing through the power transformer 12 in the event asymmetric operation of the full bridge comprised of switching transistors 16, 18, 20 and 22 occurs. Resonant inductor 14 functions in the switching operation of the four switching transistors 16, 18, 20 and 22. When the output voltage is high, a significant current flows through the load as well as through primary winding 12a of power transformer 12. When this occurs, energy is stored in resonant inductor 14 which is used to charge the stray and internal capacitance of each of the four switching transistors 16, 18, 20 and 22 at a specified time. By maintaining the capacitance of each of these four switching transistors fully charged at high output loads, zero voltage switching of the transistors and high operating efficiency of the DC-DC converter 10 is realized.

Power transformer 12 further includes a secondary winding 12b electromagnetically coupled to its primary winding 12a. An alternating voltage similar to the alternating voltage in the power transformer's primary winding 12a is induced in its secondary winding 12b. This alternating voltage is rectified by either a center tap or full wave bridge configuration. FIG. 1 shows an example of a full wave bridge configuration 38 including four (4) pairs of coupled diodes 40a and 40b. The center tap or full wave bridge rectification output is a sequence of rectangular DC pulses, where the relationship between each pulse width to the pulse period determines the magnitude of the DC output voltage. With the pulse period fixed, or constant, the pulse width is established by the aforementioned control circuit as well as by the DC load. When the DC load is increasing the pulse width also increases to compensate for a voltage drop across the various components within the output stage of the DC-DC converter. The pulsed DC output of the diode bridge 38 is provided via various electronic components such as plural filter capacitors 54a–54e and a pair of blocking diodes 56a and 56b to first and second output terminals 58 and 60. Switching transistor 52 coupled across the output lines provides for these filter capacitors 54a–54e a discharge path to neutral ground via resistor 53 for safety reasons when the DC-DC converter 10 is turned off. The configuration and operation of the DC-DC converter 10 as thus far described is conventional.

In accordance with the present invention, an inductor 24 is connected to the center tap 12c of the power transformer's primary winding 12a. The other end of inductor 24 is connected to the middle point of a voltage capacitor divider comprised of first and second serially connected capacitors 26 and 28. With the first end of inductor 24 connected to the center tap 12c of the power transformer's primary winding 12a, the inductor is symmetrically connected to the power transformer and is thus responsive to the positive and negative output current pulses of the transformer. This symmetrical connection of inductor 24 to the power transformer's primary winding 12a maintains the conductor continuously energized by the positive and negative pulse output current of the power transformer, particularly at low output modes of operation. The symmetrical coupling arrangement of the first and second capacitors 26 and 28, which form a voltage divider, to the second end of inductor 24 allows the inductor to symmetrically charge the stray and internal capacitance of the four switching transistors 16, 18, 20 and 22 forming the full bridge of the DC-DC converter 10. The symmetric voltage dividing arrangement of the first and second capacitors 26, 28 allows for the symmetric charging of the four switching transistors at all output voltage levels, but it is at low or zero output voltage levels that inductor 24 charges the stray and internal capacitance of the four switching transistors.

Referring to FIGS. 3–7, there are shown various waveforms of signals in various portions of the DC-DC converter 10 of the present invention under various operating conditions. Referring to FIG. 3, there is shown a signal waveform for the voltage between the center tap 12c of the power transfomner's primary winding 12a and the negative input at high output loading of the converter. From this figure, it can be seen that the voltage pulses provided from primary winding 12a to inductor 24 are relatively narrow and of relatively low energy. Thus, under these conditions inductor 24 provides little charging current to the four switching transistors which are maintained in a capacitance-charged state by resonant inductor 14.

Figure 4:
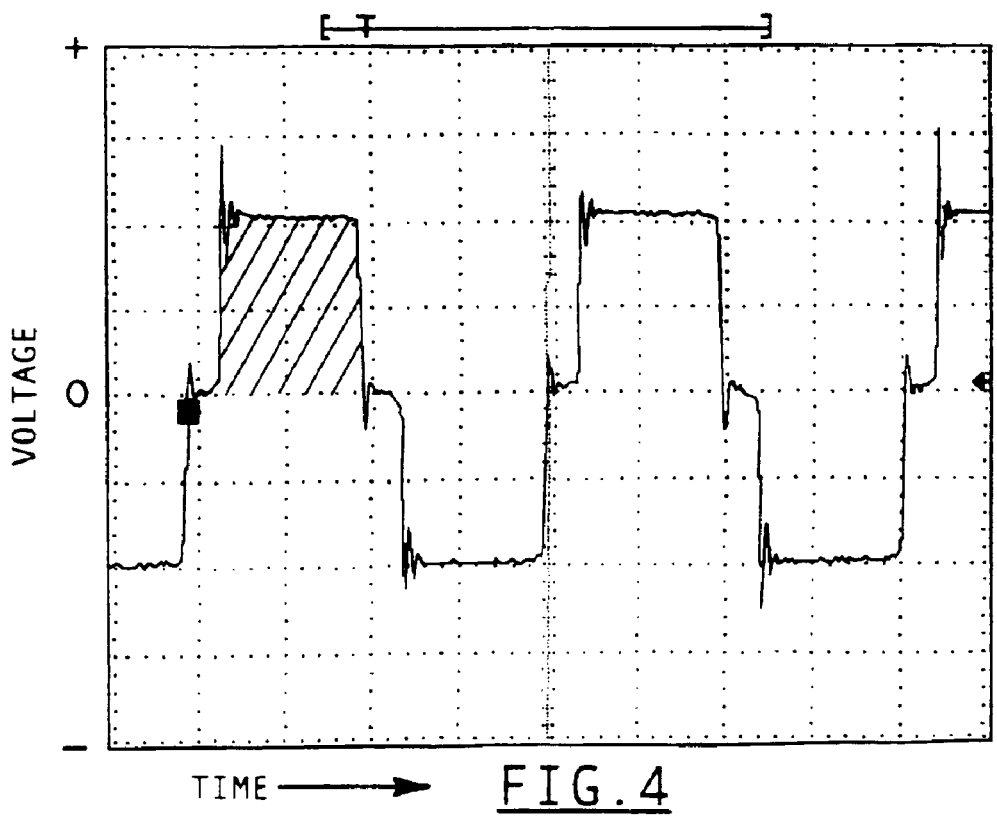
FIG. 4 shows the signal waveform across a resonant inductor in the DC-DC converter of the present invention under low load operating conditions illustrating the large amount of energy stored in the inductor in accordance with the present invention.

Referring to FIG. 4, there is shown the signal waveform for the voltage applied across inductor 24 under very low output loading conditions. A comparison of the voltage pulse widths of FIG. 4 with those of FIG. 3 indicates that much higher energy is stored in inductor 24 during low or zero output loading conditions. The voltage waveform pulses provided to inductor 24 under low loading conditions shown in FIG. 4 are much larger than the voltage waveform pulses under high loading conditions as shown in FIG. 3. This allows inductor 24 to maintain the stray and internal capacitance of the four switching transistors in a fully charged state at low or zero output loading.

Figure 5:
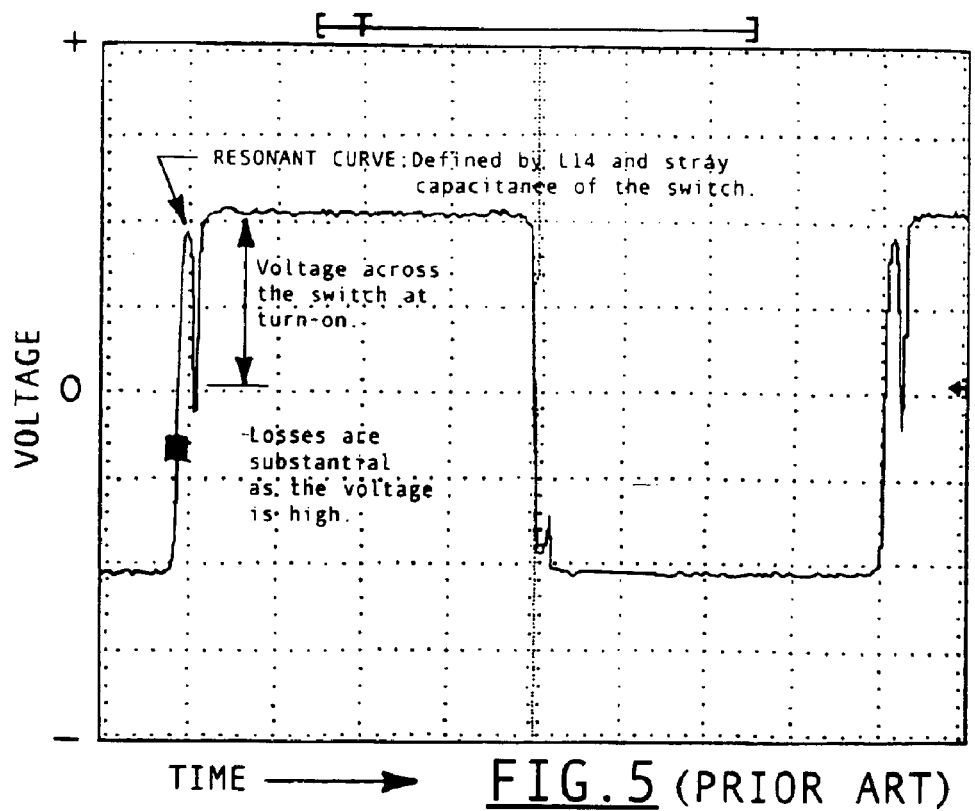
FIG. 5 shows the signal waveform across a switch in a prior art DC-DC converter under moderate operating loads.

Referring to FIG. 5, there is shown a signal waveform for the voltage applied across one of the switching transistors in the full bridge at moderate output voltage loading for a prior art DC-DC converter. At this level of output loading, in view of the large boost in voltage required to turn the switch on, substantial losses are incurred during transistor switch turn-on. Incorporating the present invention in the DC-DC converter allows inductor 24 to provide the required boost in voltage for switch turn on at low output loading.

Figure 6:
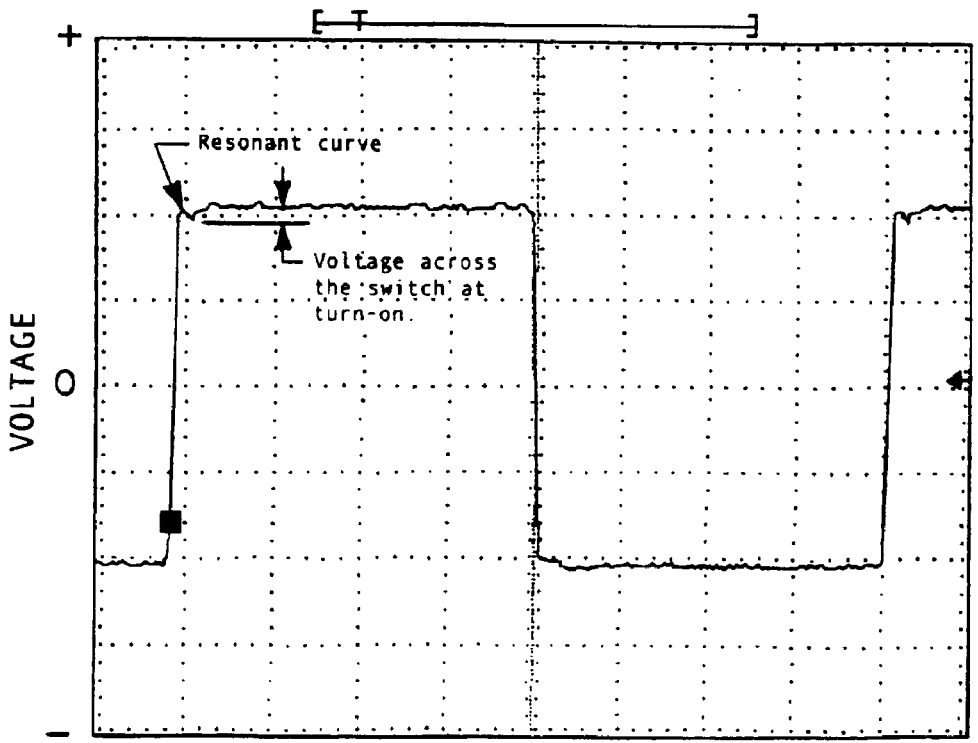
FIG. 6 shows the signal waveform across a switch in a prior art DC-DC converter under high load operating conditions.
Figure 7:
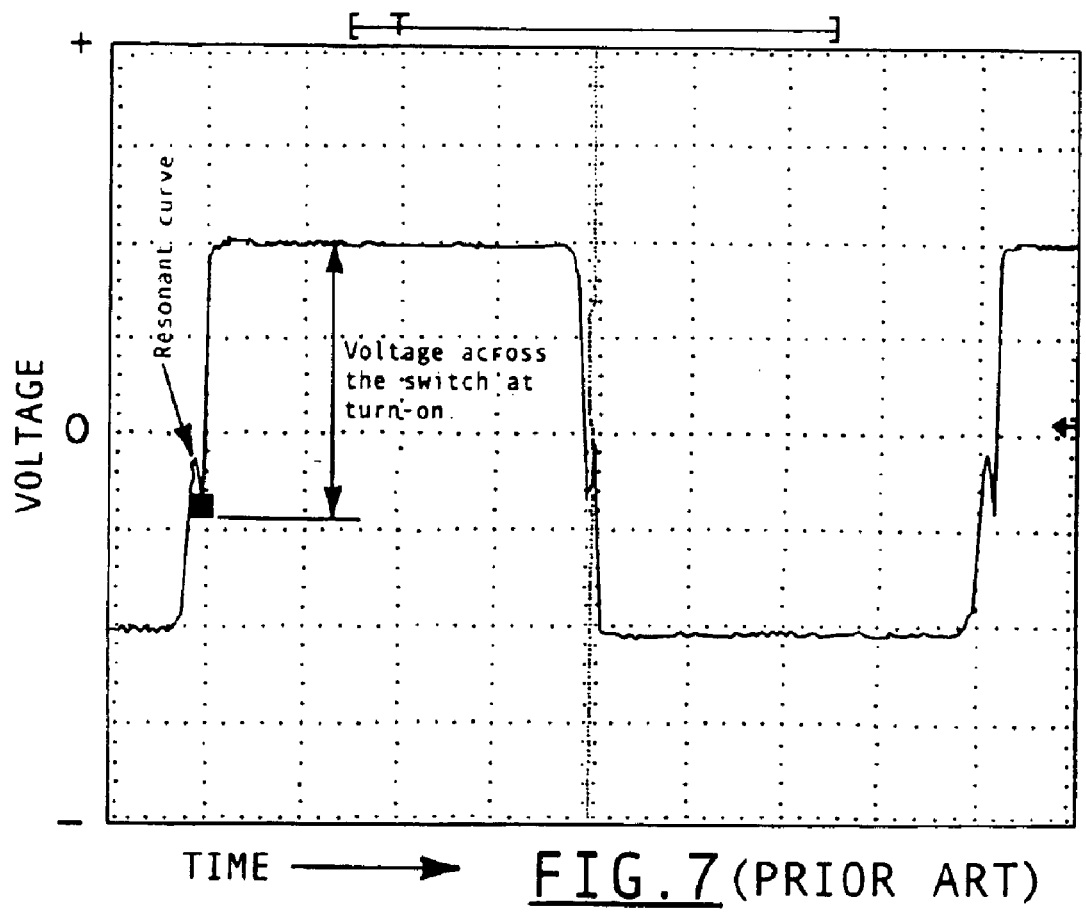
FIG. 7 shows the signal waveform across a switch in a prior art DC-DC converter under low load operating conditions.

Referring to FIG. 6, there is shown the signal waveform for the voltage across one of the transistor switches under high output loading conditions. Under these conditions, a very low voltage need be applied across the transistor switch to turn it on resulting in very low losses. Finally, referring to FIG. 7 (prior art) there is shown the signal waveform for the voltage across one of the transistor switches under low output loading conditions. Under these conditions, transistor turned-on losses are very substantial because of the large voltage which must be applied across the transistor switch to turn it on. However, using the present invention the voltage boost required to turn on the transistor switches is provided by the inductor and capacitor combination of the present invention to substantially increase DC-DC converter operating efficiency.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for converting a first DC input voltage to a second DC output voltage, said apparatus comprising:

a power transformer having primary and secondary windings, wherein an input alternating current is provided to said primary winding and an output alternating voltage is induced in said secondary winding;

first and second pairs of electronic switches connected in a bridge circuit and coupled to said power transformer, wherein said first and second pairs of switches are conductive in counter phases to accommodate a high output voltage and are conductive in the same phase to accommodate a low output voltage or a no load condition;

a first resonant inductor for recharging the switches' stray and internal capacitance during turn-on and turn-off, wherein said first resonant inductor is connected to an end of said primary winding and to said switches and is responsive to a current in said primary winding for storing energy when a high current is applied to said power transformer primary winding to allow for 0 voltage switching of the switches for a high output voltage load; and a second inductor and first and second capacitors connected to the DC input voltage and a center tap of said primary winding and responsive to voltage changes at said center tap, wherein said voltage changes produce current in said second inductor, and said second inductor stores energy when a low or 0 output voltage load is applied to said power transformer for recharging the switches' stray and internal capacitance during turn-on and turn-off of said switches to allow for 0 voltage switching of said switches for a low or 0 output voltage or no current condition.

2. The apparatus of claim 1 wherein a first end of said second inductor is connected to a center tap of said primary winding and a second opposed end of said second inductor is connected to said first and second capacitors, and wherein said first and second capacitors are symmetrically coupled to said first and second pairs of electronic switches.

3. The apparatus of claim 2 wherein said first and second capacitors are connected together in series and the second end of said second inductor is connected to a middle point between said first and second capacitors.

4. The apparatus of claim 3 wherein said first capacitor and said second capacitor each store energy and wherein said energy is provided to said second inductor for recharging the stray and internal capacitance of one of said electronic switches in each of said first and second pairs of electronic switches.

5. The apparatus of claim 1 further comprising a diode bridge coupled to said secondary winding for rectifying the output voltage.

6. The apparatus of claim 5 further comprising an inductive/capacitive output network coupled to said diode bridge for filtering the output voltage.

7. The apparatus of claim 1 further comprising a decoupling capacitor connected to the primary winding of said power transformer for blocking a DC component of the output alternating voltage from the primary winding and preventing saturation of an electromagnetic core of said power transformer.

8. The apparatus of claim 7 wherein said decoupling capacitor is connected between the primary winding of said power transformer and said first resonant inductor.

9. The apparatus of claim 1 further comprising a current transformer coupled to the primary winding of said power transformer and responsive to the first DC input voltage for providing current sensing for a control circuit.

10. Apparatus for converting a first DC input voltage to a second DC output voltage, said apparatus comprising:

a power transformer having primary and secondary windings, wherein an input alternating current is provided to said primary winding and an output alternating voltage is induced in said secondary winding;

first and second pairs of electronic switches connected in a bridge circuit and coupled to said power transformer, wherein said first and second pairs of switches are conductive in counter phases to accommodate a high output voltage load and are conductive in the same phase to accommodate a low output voltage load or a no load condition;

a first resonant inductor for recharging the switches' stray and internal capacitance during turn-on and turn-off, wherein said first resonant inductor is connected to an end of said primary winding and to said switches and is responsive to a current in said primary winding for storing energy when a high current is applied to said power transformer primary winding to allow for 0 voltage switching of the switches for a high output voltage load;

a decoupling capacitor connected between said primary winding and said first resonant inductor for blocking a DC component of the output alternating voltage from the primary winding and preventing saturation of an electromagnetic core of said power transformer; and a second inductor and first and second capacitors connected to the DC input voltage and to a center tap of primary winding and responsive to voltage changes at said center tap, wherein said voltage changes produce current in said second inductor and said second inductor stores energy when a low or 0 output voltage load is applied to said power transformer for recharging the switches' stray and internal capacitance during turn-on and turn-off of said switches to allow for 0 voltage switching of said switches for a low or 0 output voltage load or no current condition, and wherein said first and second capacitors are connected together in series and said second inductor is connected between the center tap of said primary winding and a middle point between said first and second capacitors, and wherein said second inductor and first and second capacitors are symmnetrically connected to said first and second pairs of electronic switches.

* * * * *

UNITED STATES PATENT AND TRADEMARK OFFICE
CERTIFICATE OF CORRECTION

PATENT NO.   : 6,909,617 B1
DATED        : June 21, 2005
INVENTOR(S)  : Gregory Mirskiy It is certified that error appears in the above-identified patent and that said Letters Patent is hereby corrected as shown below:

Column 8,
Line 31, change "symmnetrically" to -- symmetrically --.

Signed and Sealed this

Twenty-third Day of August, 2005

JON W. DUDAS
*Director of the United States Patent and Trademark Office*